(12) United States Patent
Kitano

(10) Patent No.: US 10,197,229 B2
(45) Date of Patent: Feb. 5, 2019

(54) LIGHT EMITTING APPARATUS

(71) Applicant: PANASONIC INTELLECTUAL PROPERTY MANAGEMENT CO., LTD., Osaka (JP)

(72) Inventor: Hiroshi Kitano, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/642,411

(22) Filed: Jul. 6, 2017

(65) Prior Publication Data

US 2018/0017220 A1 Jan. 18, 2018

(30) Foreign Application Priority Data

Jul. 12, 2016 (JP) .................................. 2016-138038

(51) Int. Cl.
| | | |
|---|---|---|
| F21V 7/04 | (2006.01) | |
| F21K 9/64 | (2016.01) | |
| F21V 29/76 | (2015.01) | |
| F21V 7/05 | (2006.01) | |
| F21V 8/00 | (2006.01) | |
| F21V 9/35 | (2018.01) | |
| F21Y 115/30 | (2016.01) | |
| F21S 8/02 | (2006.01) | |
| F21Y 113/00 | (2016.01) | |

(52) U.S. Cl.
CPC .................. *F21K 9/64* (2016.08); *F21V 7/04* (2013.01); *F21V 7/05* (2013.01); *F21V 9/35* (2018.02); *F21V 29/763* (2015.01); *G02B 6/0008* (2013.01); *F21S 8/026* (2013.01); *F21Y 2113/00* (2013.01); *F21Y 2115/30* (2016.08)

(58) Field of Classification Search
None
See application file for complete search history.

(56) References Cited

U.S. PATENT DOCUMENTS

| | | | |
|---|---|---|---|
| 2011/0157865 A1 | 6/2011 | Takahashi et al. | |
| 2013/0208496 A1* | 8/2013 | Kishimoto | F21V 9/16 362/553 |
| 2014/0078717 A1 | 3/2014 | Takahashi et al. | |
| 2015/0009703 A1 | 1/2015 | Morizumi et al. | |
| 2017/0063033 A1 | 3/2017 | Morizumi et al. | |

FOREIGN PATENT DOCUMENTS

| | | |
|---|---|---|
| JP | 2014-017096 | 1/2014 |
| JP | 2014-060164 | 4/2014 |
| JP | 2015-008155 | 1/2015 |
| JP | 2015-029034 | 2/2015 |
| JP | 2015-122447 | 7/2015 |

* cited by examiner

*Primary Examiner* — Vip Patel
(74) *Attorney, Agent, or Firm* — Greenblum & Bernstein, P.L.C.

(57) ABSTRACT

A light emitting apparatus is provided. The light emitting apparatus includes a light source which emits laser light. A first light guide, which is flexible, extends from the light source for guiding the laser light emitted by the light source. A second light guide, which has a fixed shape, is connected to the first light guide for guiding the laser light emitted by the light source. A body holds the second light guide and sends out, to an outside of the body, light based on the laser light guided by the first light guide and the second light guide.

20 Claims, 9 Drawing Sheets

LIGHT EMITTING APPARATUS

CROSS REFERENCE TO RELATED APPLICATION

This application claims the benefit of priority of Japanese Patent Application Number 2016-138038 filed on Jul. 12, 2016, the entire content of which is hereby incorporated by reference.

BACKGROUND

1. Technical Field

The present disclosure relates to a light emitting apparatus which includes alight source that emits laser light.

2. Description of the Related Art

A light emitting apparatus has already been known which emits laser light as excitation light to a phosphor to cause the phosphor to produce light and convert the laser light to light having a desired color, thus providing illumination with the resultant light having the desired color (see Japanese Unexamined Patent Application Publication No. 2015-029034, for example). In the light emitting apparatus, laser light output from a laser diode is guided, through a fiber optic cable, to a support which supports a wavelength conversion member. The laser light which has passed through the fiber optic cable excites a phosphor contained in the wavelength conversion member, whereby light having a desired color is emitted through the support.

SUMMARY

In a traditional light emitting apparatus which includes a light source, and a body spaced apart from the light source and connected to the light source by a fiber optic cable, the flexibility of the fiber optic cable provides, for example, a significant freedom to determine where the body is to be disposed. However, since the fiber optic cable is flexible, the orientation or position of the end of the fiber optic cable at the body may be changed due to, for example, shaking caused when the body is installed or used. In this case, a situation may occur in which a desired color or a desired amount of emitted light cannot be obtained. If a lens or a mirror is used to guide laser light which has passed through the fiber optic cable to the wavelength conversion member, the configuration of the apparatus will be complicated, which may cause a problem that the amount of light readily falls due to the displacement of the lens or mirror.

In view of such a problem of the traditional apparatus, the present disclosure provides a simple and reliable light emitting apparatus which includes a light source that emits laser light.

A light emitting apparatus according to an aspect of the present disclosure includes: a light source which emits laser light; a first light guide which is flexible, and extends from the light source for guiding the laser light emitted by the light source; a second light guide which has a fixed shape, and is connected to the first light guide for guiding the laser light emitted by the light source; and a body which holds the second light guide, and outputs, to an outside of the body, light based on the laser light guided by the first light guide and the second light guide.

The present disclosure provides a simple and reliable light emitting apparatus which includes a light source that emits laser light.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes a light emitting apparatus according to embodiments of the present disclosure with reference to the drawings. Note that an embodiment and variations of the embodiment described below each describe a particular example of the present disclosure. Thus, the numerical values, shapes, materials, elements, the arrangement and connection of the elements, for instance, shown in the following embodiment and variations are mere examples, and are not intended to limit the present disclosure. Therefore, among the elements in the following embodiment and variations, elements not recited in any of the independent claims defining the most generic part of the present disclosure are described as arbitrary elements.

In addition, the drawings are schematic diagrams, and do not necessarily provide strictly accurate illustration. Further, the same numeral is given to the same structural member throughout the drawings, and a description thereof may be omitted.

Embodiment

[Schematic Configuration of Light Emitting Apparatus]

Figure 1:
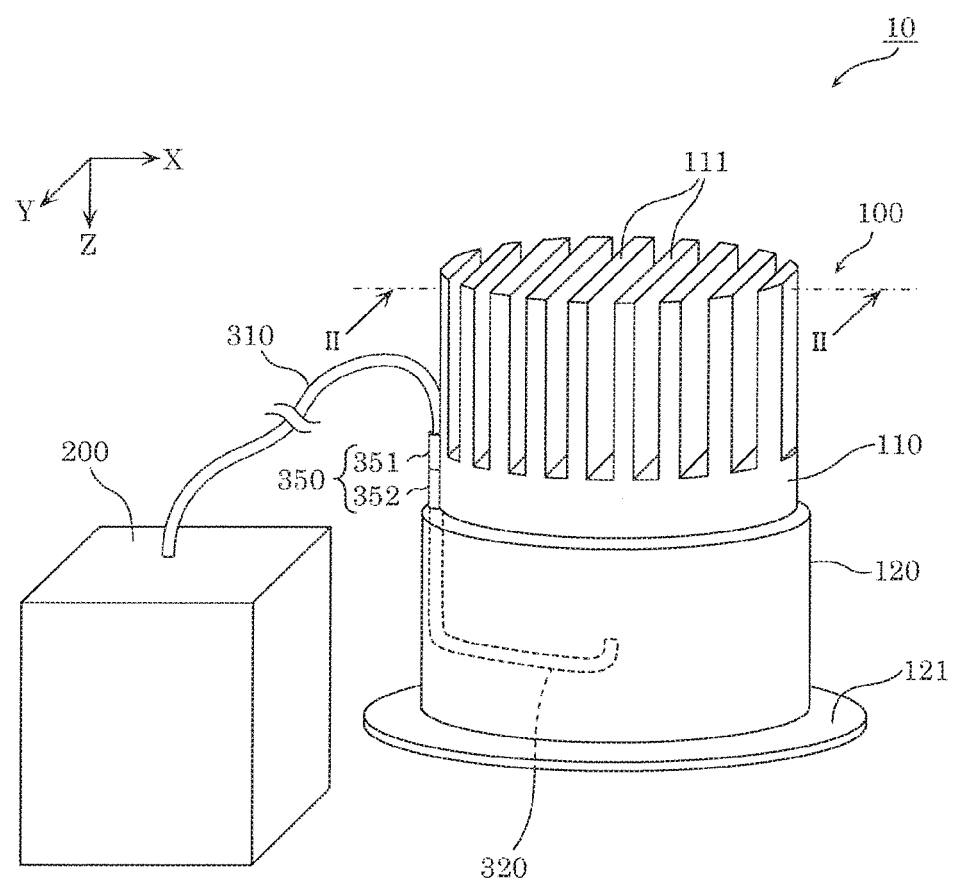
FIG. 1 is a perspective view illustrating a schematic configuration of a light emitting apparatus according to an embodiment.

FIG. 1 is a perspective view illustrating a schematic configuration of light emitting apparatus 10 according to the embodiment.

Light emitting apparatus 10 according to the present embodiment is used as a lighting apparatus which illuminates a predetermined interior or exterior space, for example. As illustrated in FIG. 1, light emitting apparatus 10 includes light source 200 which emits laser light, and body 100 which outputs light based on laser light. First light guide 310 and second light guide 320 guide laser light from light source 200 to body 100. Thus, light emitting apparatus 10 is a so-called remote phosphor light emitting apparatus.

When light emitting apparatus 10 is used as an interior lighting apparatus, body 100 is disposed in the ceiling of a building, for example, and light source 200 is disposed in the roof space, for example.

Note that the disposition locations and orientations of body 100 and light source 200 are not limited to particular disposition locations and orientations, yet FIG. 1 and the drawings following FIG. 1 illustrate that a main direction in which body 100 outputs light is the positive direction of the Z axis. In other words, when body 100 is disposed in the ceiling, the positive direction of the Z axis is the reaction of the floor (downward).

Light source 200 generates laser light, and supplies the laser light to body 100 through first light guide 310 and second light guide 320. Light source 200 includes one or more semiconductor laser elements which emit laser light having a wavelength for purple-blue light to blue light (400 nm to 490 nm), for example.

First light guide 310 is a flexible member which extends from light source 200, and is a fiber optic cable in the present embodiment. Second light guide 320 is a member having a fixed shape (rigid) and connected to first light guide 310. In the present embodiment, second light guide 320 is a rigid fiber optic cable, and is held by body 100.

Body 100 includes heat sink 110 on which a later-described light emitter is disposed, and cylindrical frame 120 disposed surrounding the light emitter. Heat sink 110 is a metal member made of, for example, aluminum or an aluminum alloy, and includes a plurality of fins 111 exposed outside. Frame 120 includes flange 121 protruding outward, and flange 121 is fixed to the ceiling using, for example, screws not illustrated, whereby body 100 is attached to the ceiling.

Light emitting apparatus 10 according to the present embodiment further includes connecting member 350 which detachably connects first light guide 310 and second light guide 320. Specifically, connecting member 350 includes first connecting member 351 provided at an end of first light guide 310, and second connecting member 352 provided at an end of second light guide 320. One of first connecting member 351 and second connecting member 352 is detachably connected to the other using a predetermined technique such as fitting, screwing, or fastening.

In the present embodiment, second connecting member 352 is provided at a portion of second light guide 320 protruding from body 100, and first connecting member 351 and second connecting member 352 are connected or disconnected (detached) outside of body 100.

In light emitting apparatus 10 having the above configuration, body 100 includes a light emitter which contains a wavelength conversion material, the wavelength of laser light led to body 100 is converted, and thereafter resultant light is output from body 100 to the outside of body 100. The following describes in detail light emitting apparatus 10 having such a function, mainly focusing on the configuration of the body.

[Configuration of Body]

Figure 2:
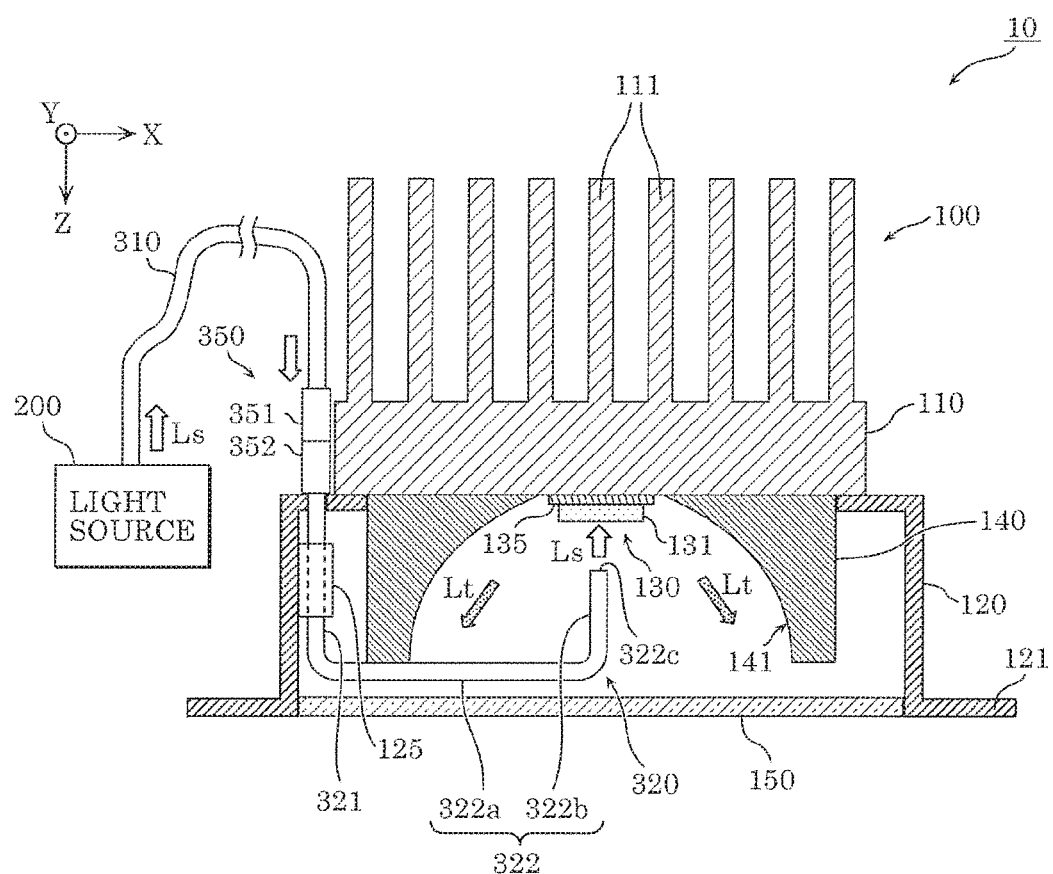
FIG. 2 is a cross-sectional view illustrating a schematic configuration of a body according to the embodiment.

FIG. 2 is a cross-sectional view illustrating a schematic configuration of body 100 according to the embodiment. Specifically, FIG. 2 illustrates a cross-sectional view taken along line II-II in FIG. 1 (cross-sectional view in the XZ plane passing through line II-II), and the lateral surfaces of second light guide 320 and holding portion 125.

Figure 3:
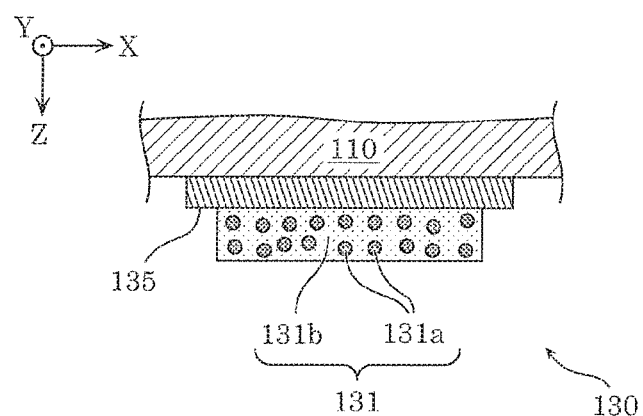
FIG. 3 is a cross-sectional view illustrating a schematic configuration of a light emitter according to the embodiment.
Figure 4:
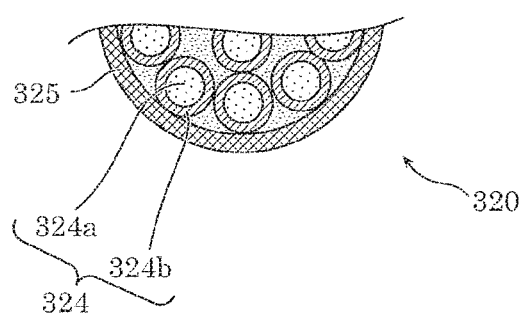
FIG. 4 is a cross-sectional view illustrating a schematic configuration of a second light guide according to the embodiment.

FIG. 3 is a cross-sectional view illustrating a schematic configuration of light emitter 130 according to the embodiment, and FIG. 4 is a cross-sectional view illustrating a schematic configuration of second light guide 320 according to the embodiment. Note that FIG. 3 illustrates a cross section in the XZ plane passing through the center of light emitter 130, and FIG. 4 illustrates a cross section of second light guide 320 perpendicular to the axis of second light guide 320.

As illustrated in FIG. 2, body 100 includes light emitter 130 containing a wavelength conversion material which converts the wavelength of laser light Ls emitted through second light guide 320. Light emitter 130 outputs light Lt after the wavelength of laser light Ls is converted to the outside of body 100. Light emitter 130 is fixed to heat sink 110 such that the rear surface (surface of light reflector plate 135 opposite the surface on which wavelength converter 131 is disposed) is in contact with heat sink 110. Light emitter 130 is fixed to heat sink 110 by, for example, being adhered to heat sink 110 using an adhesive or being fastened to heat sink 110 using screws, for instance.

More specifically, light emitter 130 includes flat light reflector plate 135, and wavelength converter 131 disposed on light reflector plate 135, as illustrated in FIGS. 2 and 3. As illustrated in FIG. 2, the end surface of second light guide 320 is disposed at a position where the end surface is opposed to light emitter 130, and laser light Ls is emitted towards light emitter 130 through the end surface. Emitted laser light Ls enters wavelength converter 131 of light emitter 130, is reflected by light reflector plate 135, and output from light emitter 130. When output from light emitter 130, the wavelength of laser light Ls is converted by wavelength converter 131.

In the present embodiment, wavelength converter 131 is formed using light transmission resin material 131b which contains yellow phosphor 131a as a wavelength conversion material (see FIG. 3). As light transmissive resin material 131b, methyl silicone resin, for example, is used, yet epoxy resin or urea resin may be used. For example, heat resistance can be improved by including inorganic material such as glass or ceramics in light transmissive resin material 131b.

Yellow phosphor 131a is an example of a wavelength conversion material, and produces yellow fluorescence by being excited by laser light Ls emitted through second light guide 320. As yellow phosphor 131a, yttrium aluminum garnet (YAG) phosphor is used, for example.

In the present embodiment, yellow phosphor 131a contained in wavelength converter 131 converts the wavelength of a portion of, for example, blue laser light Ls to the wavelength of yellow light. Blue light not absorbed by yellow phosphor 131a and yellow light as a result of wavelength conversion by yellow phosphor 131a are diffused and mixed in wavelength converter 131. Thus, white light is output from wavelength converter 131. Note that white light output from wavelength converter 131 is an example of light based on laser light Ls, and is light Lt after the wavelength of laser light Ls is converted by light emitter 130 in the present embodiment.

Specifically, in the present embodiment, laser light Ls which has entered wavelength converter 131 from the positive side of the Z axis is reflected by light reflector plate 135, and output from wavelength converter 131 to the positive side of the Z axis. From when laser light Ls enters wavelength converter 131 until when laser light Ls is output from wavelength converter 131, wavelength conversion, diffusion, and mixture as described above are performed in wavelength converter 131, and as a result, white light which is light Lt after the wavelength of laser light Ls is converted is output from light emitter 130. Specifically, light emitter 130 according to the present embodiment can be expressed, for example as a reflecting phosphor device.

Note that light reflector plate 135 is a flat metal member made of, for example, aluminum or an aluminum alloy, and the light reflectance of at least one surface among two lengthwise surfaces is improved by polishing or reflective coating. Light emitter 130 is obtained by applying or printing light transmissive resin material 131b containing yellow phosphor 131a which is a wavelength conversion material onto the at least one surface. Note that light reflector plate 135 is not necessarily a metal plate, and for example, a flat member which is a glass substrate having a surface on which a metal layer is formed may be adopted as light reflector plate 135.

In the present embodiment, body 100 further includes reflection member 140 disposed surrounding light emitter 130. Reflection member 140 includes reflection surface 141 which forms a curved reflective surface, as illustrated in FIG. 2. Among light Lt output from light emitter 130, light that travels to reflection surface 141 is reflected by reflection surface 141, and travels outward (in the positive direction of the Z axis). Accordingly, light Lt output from light emitter 130 is efficiently released to the outside of body 100.

Light transmissive cover member 150 is disposed in front of light emitter 130 and reflection member 140, and light Lt output from light emitter 130 passes through cover member 150, and goes out of body 100. The material of cover member 150 is glass or resin, for instance, and cover member 150 has a role of preventing foreign substances such as dust from adhering to light emitter 130, for example. Note that cover member 150 may have an optical function such as diffusing or concentrating light.

Here, second light guide 320 which guides laser light Ls to light emitter 130 is fixed to body 100 by being held by holding portion 125 of body 100, as illustrated in FIG. 2, for example.

Specifically, holding portion 125 holds second light guide 320 outside of reflection member 140. Thus, holding portion 125 does not block light Lt output from light emitter 130. However, the end portion of second light guide 320 opposed to light emitter 130 is in a position spaced apart from holding portion 125, and thus a problem of change in a relative position of the end portion with respect to light emitter 130 may arise.

However, second light guide 320 has a fixed shape (constant shape), unlike flexible first light guide 310. This prevents change in the relative position of the end portion of second light guide 320 with respect to light emitter 130 even if the end portion is not mechanically fixed.

Specifically, second light guide 320 according to the present embodiment includes held portion 321 which includes a portion held by holding portion 125, and extending portion 322 which extends from held portion 321. Extending portion 322 includes end surface 322c through which laser light Ls is emitted. More specifically, extending portion 322 includes arm portion 322a which is elongated, and light emitting portion 322b which extends from the end of arm portion 322a, in a direction crossing the longitudinal direction of arm portion 322a. Light emitting portion 322b includes end surface 322c through which laser light Ls is emitted.

As described above, second light guide 320 has a fixed shape, and thus even if second light guide 320 has a portion through which laser light Ls is emitted at a position spaced apart from the portion that is held (portion fixed to body 100), change in the position where laser light Ls is emitted is prevented.

Here, second light guide 320 includes bundled optical fibers 324, as illustrated in, for example, FIG. 4. Specifically, second light guide 320 according to the present embodiment is an optical member which guides light which has entered through one end from the one end to the other end, by repeating total reflection of the light.

Optical fibers 324 are covered by covering 325 made of glass, for example. Each of optical fibers 324 includes core 324a and clad 324b covering core 324a both made of glass, for example, and has an outside diameter of about 0.1 mm. Bundled optical fibers 324 and covering 325 are, for example, fused by being heated, whereby the shape of second light guide 320 is fixed. The outside diameter of second light guide 320 having such a configuration is about 1 mm to 10 mm.

Note that in the embodiment described above, holding portion 125 is disposed on the inner surface of frame 120, and fixes the position of second light guide 320 by, for example, holding held portion 321 of second light guide 320. However, how second light guide 320 is held by holding portion 125 is not limited to this. For example, an opening in frame 120 which is a portion through which second light guide 320 is passing may function as a holding portion.

Advantageous Effects and Others

As described above, light emitting apparatus 10 according to the present embodiment includes: source 200 which emits laser light; first light guide 310 which is flexible, and extends from light source 200 for guiding the laser light emitted by light source 200; second light guide 320 which has a fixed shape, and is connected to first light guide 310 for gliding the laser light emitted by light source 200; and body 100 which holds second light guide 320, and outputs, to an outside of body 100, light based on the laser light guided by first light guide 310 and second light guide 320.

According to this configuration, first light guide 310 which connects light source 200 and body 100 is flexible, which provides a significant freedom to determine where body 100 is to be disposed, for example. In addition, the shape of second light guide 320 held by body 100 is fixed, and thus even if, for example, the end portion of second light guide 320 through which laser light is emitted is not fixed to body 100, the position of the end portion can be maintained. This prevents a problem such as, for example, change in the position of the end portion of second light guide 320 from the original position due to shaking given to body 100 in the process of manufacturing light emitting apparatus 10 or when body 100 is installed, for instance. Specifically, a desired color and/or amount of light emitted can be continuously obtained without disposing, at the end portion of second light guide 320, another member for fixing the end portion.

As described above, light emitting apparatus 10 according to the present embodiment is a highly reliable apparatus which includes a light source that emits laser light.

Specifically, body 100 in the present embodiment includes holding portion 125 which holds held portion 321 of second light guide 320. Second light guide 320 includes: hold portion 321; and extending portion 322 which extends from held portion 321, and includes end surface 322c through which the laser light is emitted. Note that in the present embodiment, extending portion 322 extends from held portion 321 in a direction (the X axis direction, see FIG. 2) crossing a direction (the Z axis direction, see FIG. 2) in which light is guided in held portion 321.

According to this configuration, laser light guided from light source 200 can be emitted to light emitter 130 through second light guide 320, and furthermore, change in the position where light is emitted can be prevented, even if light emitter 130 is spaced apart from holding portion 125, for example.

More specifically, extending portion 322 included in second light guide 320 in the present embodiment includes: arm portion 322a which is elongated and extends in a longitudinal direction; and light emitting portion 322b which extends from an end of arm portion 322a in a direction crossing the longitudinal direction of arm portion 322a, and includes end surface 322c through which the laser light is emitted.

According to this configuration, extending portion 322 may have at least one portion where the direction in which light is guided is changed, for example. This provides a significant freedom to determine where light emitter 130 is to be disposed, for example.

In the present embodiment, body 100 includes light emitter 130 which includes yellow phosphor 131a which converts a wavelength of the laser light guided by second light guide 320, and body 100 outputs, to the outside of body 100, light after the wavelength of the laser light is converted, the light being based on the laser light.

According to this configuration, yellow phosphor 131a which is a wavelength conversion material is spaced apart from light source 200, and thus deterioration of yellow phosphor 131a and/or light transmission resin material 131b due to heat, for example, is prevented. Also, for example, body 100 does not require supply of power nor an electric component, and thus, for example, body 100 can be readily disposed outside where body 100 may be exposed to rain. Alternatively, body 100 may be readily disposed underwater.

Light emitter 130 in the present embodiment further includes light reflector plate 135 which reflects light, and yellow phosphor 131a is located on light reflector plate 135, on a side which receives the laser light.

Thus, in body 100, laser light enters light emitter 130 from the front (side to which light is output) relative to light emitter 130, and light emitter 130 converts the wavelength of the laser light which has entered and outputs the light forward. Accordingly, light emitter 130 is a reflective phosphor device. Hence, a structure for supplying laser light to light emitter 130 is unnecessary on the rear side of light emitter 130. This, therefore, provides a significant freedom to determine where light emitter 130 is to be disposed, for example. Furthermore, heat is readily dissipated from light emitter 130.

The end portion (light emitting portion 322b in the present embodiment) of second light guide 320 through which laser light is emitted is disposed forward relative to light emitter 130. Yet, the shape of second light guide 320 is fixed, and thus it is not necessary to dispose another member for fixing the end portion. In other words, the relative position of the end portion of second light guide 320 with respect to light emitter 130 is maintained without disposing another member which may block light output from light emitter 130.

Body 100 in the present embodiment includes heat sink 110 disposed in contact with a surface of light emitter 130 on a side opposite the side which receives the laser light.

According to this configuration, light emitter 130 is disposed on heat sink 110 in a state where the rear surface of light emitter 130 is in contact with heat sink 110. Accordingly, for example, heat is conducted (dissipated) from the entire rear surface of light emitter 130 to heat sink 110. Thus, heat of light emitter 130 is efficiently dissipated. As a result, for example, deterioration of wavelength converter 131 included in light emitter 130 is prevented, and thus the quality of light emitting apparatus 10 is maintained or the life of light emitting apparatus 10 can be extended.

Light emitting apparatus 10 according to the present embodiment further includes: connecting member 350 which detachably connects first light guide 310 and second light guide 320.

According to this configuration, for example, when the work for installing light emitting apparatus 10 is conducted, light source 200 and body 100 can be each installed, being physically separated. In the spot in which light emitting apparatus 10 is installed, a route for supplying laser light is readily formed (first light guide 310 and second light guide 320 are readily connected), and thus work for installing light emitting apparatus 10 is more efficiently conducted.

In the present embodiment, second light guide 320 includes bundled optical fibers 324. Each of optical fibers 324 has a small outside diameter as mentioned above, and thus the curvature radius when optical fiber 324 is bent can be decreased without creating loss of guided light. To put it simply, optical fibers 324 may each have a comparatively sharp bent portion. Accordingly, for example, second light guide 320 may have comparatively sharp bent portions, as illustrated in FIG. 2, and also can be formed in a compact size. As a result, for example, the size of body 100 can be decreased without reducing optical output from body 100.

Note that first light guide 310 may not need to have a small curvature radius when bent, compared with second light guide 320. In this case, the numerical aperture (NA) of each of the plural optical fibers included in first light guide 310 may be smaller than NA of each of optical fibers 324 included in second light guide 320.

This completes the description of light emitting apparatus 10 according to the embodiment, yet light emitting apparatus 10 may include light source 200 and/or body 100 having configurations different from the configurations illustrated in FIGS. 1 to 4. The following describes variations of light source 200 and body 100 according to the embodiment, focusing on differences from those in the embodiment described above.

Figure 5:
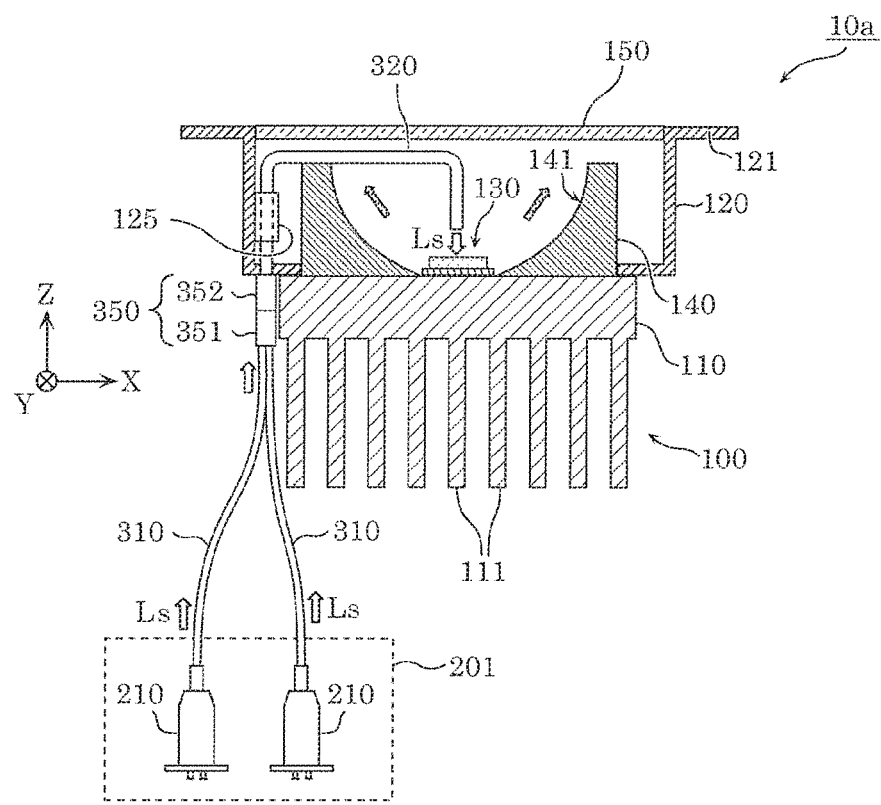
FIG. 5 is a diagram illustrating a schematic configuration of a light emitting apparatus according to Variation 1 of the embodiment.

FIG. 5 is a diagram illustrating a schematic configuration of light emitting apparatus 10a according to Variation 1 of the embodiment. Specifically, FIG. 5 illustrates a cross section of body 100 taken at a position corresponding to line II-II in FIG. 1, and lateral surfaces of second light guide 320 and holding portion 125. Further, FIG. 5 conceptually illustrates light source 201. FIG. 5 illustrates body 100 oriented such that the light emitting direction is upward. The supplemental matters with regard to FIG. 5 also apply to FIGS. 6 to 11 and 13 later described.

Light emitting apparatus 10a according to Variation 1 illustrated in FIG. 5 includes light source 201 and body 100, and body 100 outputs light based on laser light guided by first light guide 310 and second light guide 320 from light source 201. Second light guide 320 has a fixed shape, and is held by body 100. This configuration is common to light emitting apparatus 10a according to Variation 1, and light emitting apparatus 10 according to the above embodiment described above.

Light emitting apparatus 10a according to this variation has features that light source 201 includes two laser devices 210, and laser light emitted by two laser devices 210 is supplied to second light guide 320 through two first light guides 310. Note that two laser devices 210 emit laser light using semiconductor laser elements, for example.

Accordingly, supplying laser light Ls to second light guide 320 using plural laser devices 210 improves, for example, the luminous flux of light output from light emitter 130.

Note that light source 201 includes two laser devices 210 in FIG. 5, yet light source 201 may supply laser light to body 100 using three or more laser devices 210.

Laser light emitted by plural laser devices 210 may be combined inside light source 201, and the combined laser light may be supplied to body 100 through single first light guide 310.

Figure 6:
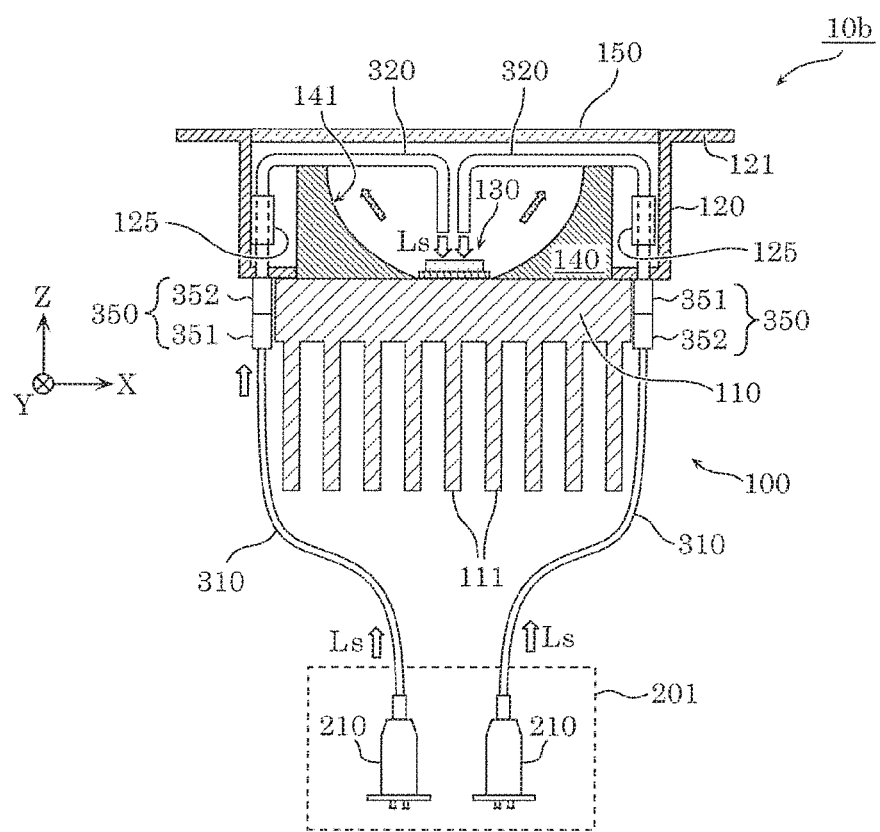
FIG. 6 is a diagram illustrating a schematic configuration of a light emitting apparatus according to Variation 2 of the embodiment.

FIG. 6 is a diagram illustrating a schematic configuration of light emitting apparatus 10b according to Variation 2 of the embodiment.

Light emitting apparatus 10b according to Variation 2 illustrated in FIG. 6 includes light source 201 which includes two laser devices 210. Body 100 outputs light based on laser light guided by first light guide 310 and second light guide 320 from light source 201. This configuration is common to light emitting apparatus 10b according to Variation 2 and light emitting apparatus 10a according to Variation 1 described above.

Light emitting apparatus 10b according to this variation has a feature that light emitter 130 is irradiated with laser light Ls which two laser devices 210 individually emit through two second light guides 320.

Light emitter 130 is irradiated with laser light Ls emitted by plural laser devices 210 through plural second light guides 320 as described above, whereby, for example, an optical system for light emission in body 100 can be configured to have a point symmetry or line symmetry in a plan view (when viewed in the Z axis direction). Accordingly, luminance unevenness and color unevenness of light output from light emitter 130 can be reduced.

Figure 7:
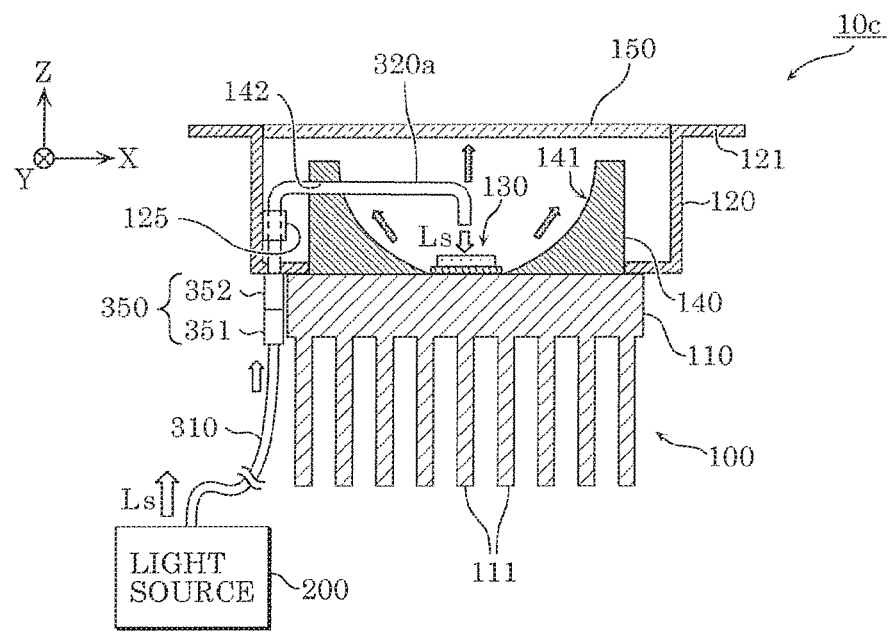
FIG. 7 is a diagram illustrating a schematic configuration of a light emitting apparatus according to Variation 3 of the embodiment.

FIG. 7 is a diagram illustrating a schematic configuration of light emitting apparatus 10c according to Variation 3 of the embodiment.

Light emitting apparatus 10c according to Variation 3 illustrated in FIG. 7 includes light source 200 and body 100, and body 100 outputs light based on laser light guided by first light guide 310 and second light guide 320a from light source 200. Second light guide 320a has a fixed shape, and is held by body 100. This basic structure is common to light emitting apparatus 10c according to Variation 3, and light emitting apparatus 10 according to the embodiment described above.

Light emitting apparatus 10c according to this variation has a feature that second light guide 320a is passing through reflection member 140. Specifically, through-hole 142 is formed in reflection member 140, and second light guide 320a is held by body 100, passing through through-hole 142.

In this case, the overall length (the length along the axis) of second light guide 320a according to this variation is shorter than the overall length (the length along the axis) of second light guide 320 according to the embodiment described above. Accordingly, for example, second light guide 320a is more likely to prevent loss of light than second light guide 320. Since second light guide 320a is passing through reflection member 140, the size of body 100 according to this variation in the height direction (the Z axis direction) can be made smaller than body 100 according to the embodiment described above. Accordingly, the size of body 100 can be reduced.

Note that reflection member 140 may have a groove which extends downward from the upper edge surface in FIG. 7 (the groove passing through reflection member 140 in the X axis direction), instead of through-hole 142. In this case, second light guide 320a can be disposed at the same position as in FIG. 7, by inserting second light guide 320a from the upper edge of the groove. This also applies to the light emitting apparatuses according to Variations 4 to 6 in which the second light guide is held by body 100, passing through reflection member 140, similarly to this variation.

Figure 8:
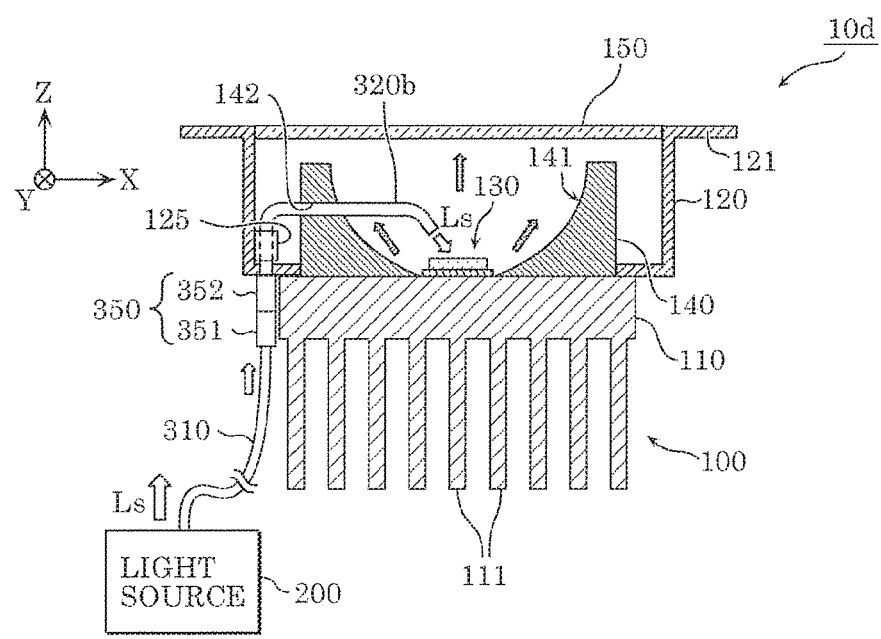
FIG. 8 is a diagram illustrating a schematic configuration of the light emitting apparatus according to Variation 4 of the embodiment.

FIG. 8 is a diagram illustrating a schematic configuration of light emitting apparatus 10d according to Variation 4 of the embodiment.

In light emitting apparatus 10d according to Variation 4 illustrated in FIG. 8, second light guide 320b is held by body 100, passing though through-hole 142 of reflection member 140. This configuration is common to light emitting apparatus 10d according to Variation 4, and light emitting apparatus 10c according to Variation 3 described above.

Light emitting apparatus 10d according to this variation has a feature that light emitter 130 is irradiated with laser light Ls emitted obliquely from above through second light guide 320b in FIG. 8. In other words, the end portion of second light guide 320b is disposed at a position away from the position in front of the center of light emitter 130.

Accordingly, with regard to light which light emitter 130 outputs frontward (in the positive direction of the Z axis), the amount of light blocked by second light guide 320b can be reduced, for example. In this case, for example, the luminous flux of light from body 100 can be increased without increasing the output of laser light from light source 200.

Figure 9:
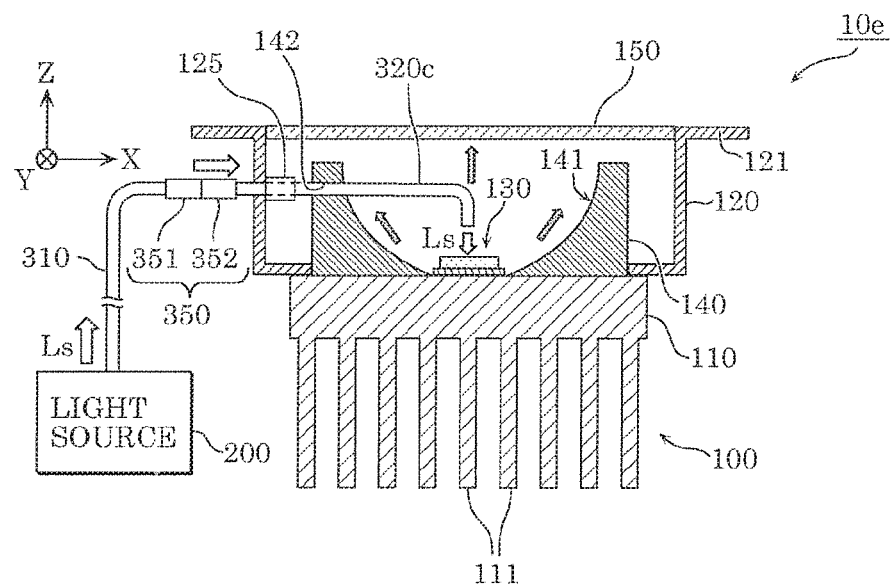
FIG. 9 is a diagram illustrating a schematic configuration of a light emitting apparatus according to Variation 5 of the embodiment.

FIG. 9 is a diagram illustrating a schematic configuration of light emitting apparatus 10e according to Variation 5 of the embodiment.

In light emitting apparatus 10e according to Variation 5 illustrated in FIG. 9, second light guide 320c is held by body 100, passing through reflection member 140. This configuration is common to light emitting apparatus 10e according to Variation 5 and light emitting apparatus 10d according to Variation 4 described above.

Light emitting apparatus 10e according to this variation has a feature that second light guide 320c is passing through the wall of frame 120 in the X axis direction. In this case, second light guide 320c has only one bent portion, and thus the loss of light in second light guide 320c is reduced, for example.

Connecting member 350 is oriented so as to be laterally long (elongated in the X axis direction). Accordingly, for example, work for connecting first light guide 310 and second light guide 320c can be readily conducted even if there is an obstacle on the back of heat sink 110 at the place where body 100 is to be installed.

Figure 10:
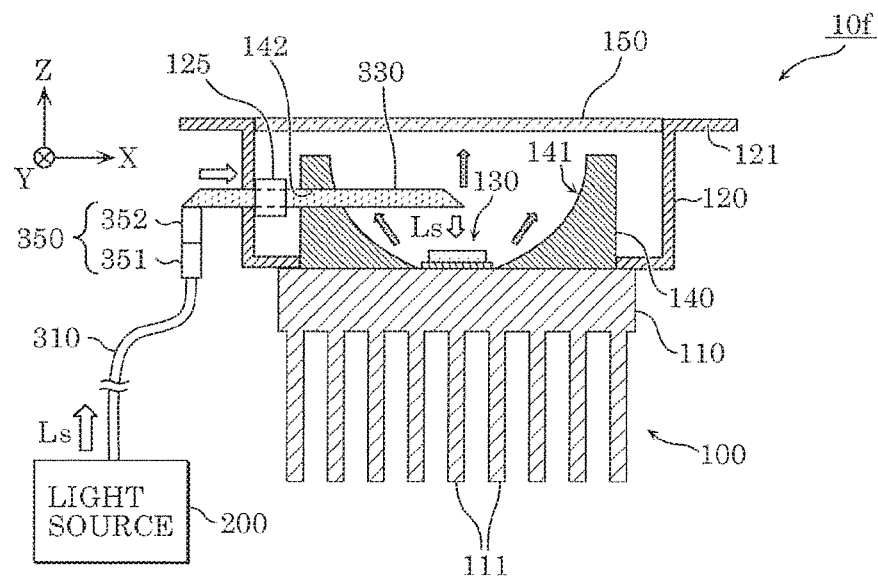
FIG. 10 is a diagram illustrating a schematic configuration of a light emitting apparatus according to Variation 6 of the embodiment.

FIG. 10 is a diagram illustrating a schematic configuration of light emitting apparatus 10f according to Variation 6 of the embodiment.

Light emitting apparatus 10f according to Variation 6 illustrated in FIG. 10 includes light source 200 and body 100, and body 100 outputs light based on laser light guided by first light guide 310 and second light guide 330 from light source 200. Second light guide 330 has a fixed shape, and is held by body 100. This configuration is common to light emitting apparatus 10f according to Variation 6, and light emitting apparatus 10 according to the embodiment described above.

Light emitting apparatus 10f according to this variation has a feature that second light guide 330 is not a fiber optic cable, but a prism. The prism serving as second light guide 330 is a rigid member formed, for example, using optical glass. Second light guide 330 has slopes inclined at approximately 45 degrees relative to the longitudinal direction of second light guide 330 (the X axis direction in FIG. 10), on the light entering side and the light exiting side, as illustrated in FIG. 10. The slopes of second light guide 330 change the light traveling direction, whereby second light guide 330 causes light which has entered second light guide 330 to reach light emitter 130. Specifically, laser light Ls which has entered second light guide 330 through an end thereof from first light guide 310 via connecting member 350 is reflected by the slope on the light entering side, and consequently the traveling direction is changed approximately 90 degrees. Then, the light travels toward the slope on the light exiting side, and is further reflected by the slope on the light exiting side. Consequently, the traveling direction is changed approximately 90 degrees, and the light travels toward light emitter 130. As a result, light emitter 130 is irradiated with laser light Ls which has entered second light guide 330, and then converts the wavelength of laser light Ls and outputs resultant light.

For example, the shape of second light guide 330 is more reliably fixed by adopting a prism formed using, for instance, optical glass as second light guide 330. In other words, change in the position of the end portion of second light guide 330 caused by shaking is more reliably prevented. Furthermore, the loss of guided light can be further reduced, compared with bundle fibers.

Note that second light guide 330 is disposed, passing through through-hole 142 of reflection member 140 in this variation, yet second light guide 330 may be disposed, passing over the opening edge of reflection member 140, similarly to second light guide 320 according to the embodiment described above.

The shape of second light guide 330 illustrated in FIG. 10 is an example. For example, second light guide 330 may have an end surface parallel to the YZ plane at the left end in FIG. 10. In this case, the course of laser light Ls which has entered through the end surface can be changed by the inclined end surface on the right to be in a direction toward light emitter 130. Accordingly, the loss of light in second light guide 330 is reduced, for example. Furthermore, in this case, connecting member 350 is oriented so as to be laterally long (elongated in the X axis direction). Accordingly, similarly to light emitting apparatus 10e according to Variation 5 described above, work for connecting first light guide 310 and second light guide 330 can be readily conducted oven if there is an obstacle on the back of heat sink 110.

Figure 11:
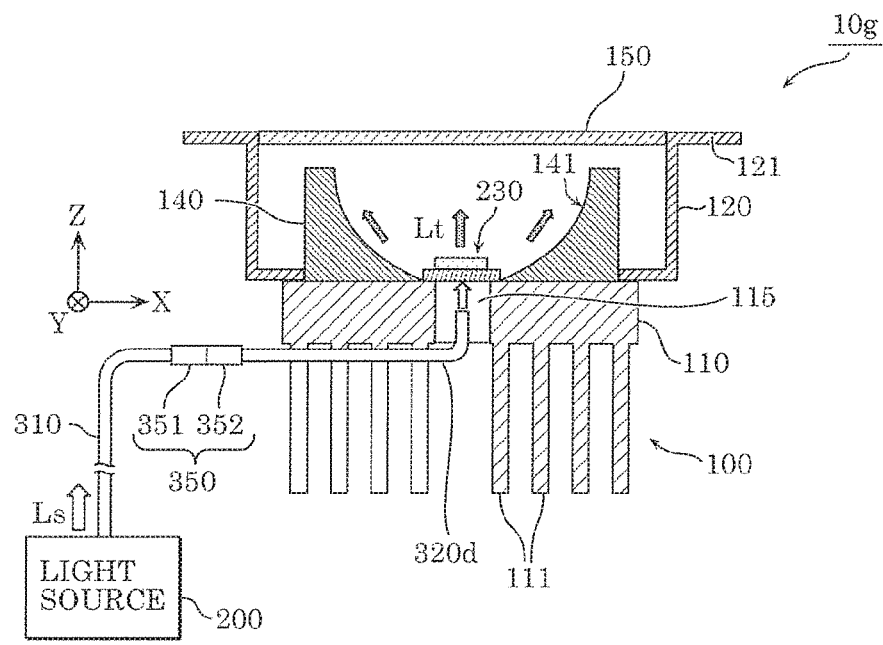
FIG. 11 is a diagram illustrating a schematic configuration of a light emitting apparatus according to Variation 7 of the embodiment.
Figure 12:
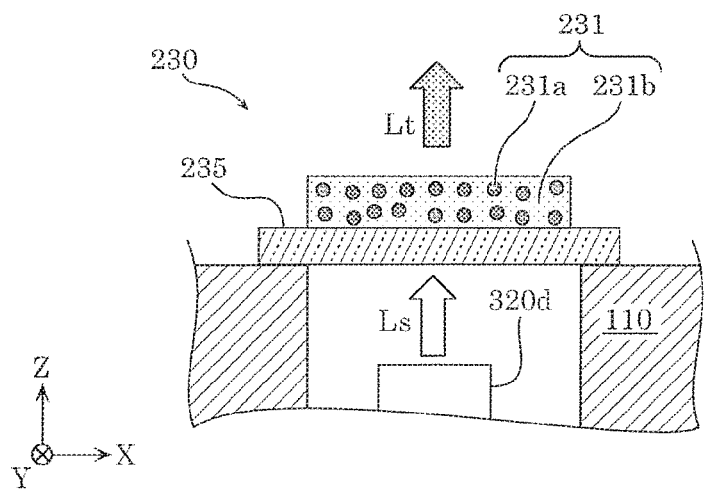
FIG. 12 is a cross-sectional view illustrating a schematic configuration of a light emitter according to Variation 7 of the embodiment.

FIG. 11 is a diagram illustrating a schematic configuration of light emitting apparatus 10g according to Variation 7 of the embodiment. FIG. 12 is a cross-sectional view illustrating a schematic configuration of light emitter 230 according to Variation 7 of the embodiment.

Light emitting apparatus 10g according to Variation 7 illustrated in FIG. 11 includes light source 200 and body 100, and body 100 outputs light based on laser light guided by first light guide 310 and second light guide 320d from light source 200. Second light guide 320d has a fixed shape, and is held by body 100. This configuration is common to light emitting apparatus 10g according to Variation 7, and light emitting apparatus 10 according to the embodiment described above.

Light emitting apparatus 10g according to this variation has a feature that light emitter 230 is a light-transmissive phosphor device, unlike light emitter 130 according to the embodiment described above.

Specifically, light emitter 230 according to this variation includes substrate 235 and wavelength converter 231, as illustrated in FIG. 12. The base material of substrate 235 is a light-transmissive material such as glass or sapphire, for example. Wavelength converter 231 is formed using light-transmissive resin material 231b which contains yellow phosphor 231a as a wavelength conversion material, similarly to wavelength converter 131 according to the embodiment described above.

Second light guide 320d is disposed relative to light emitter 230 having the above configuration, such that laser light is emitted from the rear side of light emitter 230, as illustrated in FIG. 11. Specifically, through-hole 115 in which second light guide 320d is inserted is formed in the central portion of heat sink 110. Lengthwise cut-outs are formed in plural fins 111 of heat sink 110, and second light guide 320d is inserted in the cut-outs, thus being disposed across plural fins 111.

Note that second light guide 320d is fixed to body 100 by being, for example, put in the cut-outs of plural fins 111, yet second light guide 320d may be fixed to body 100 by being held by other portions of body 100. For example, a gasket that fills a space between second light guide 320d and the inner surface of through-hole 115 may be disposed in through-hole 115.

Second light guide 320d may not be disposed across plural fins. For example, a straight second light guide may be inserted in an orientation parallel to the Z axis from beneath through-hole 115.

Laser light Ls which is emitted through second light guide 320d, and has entered light emitter 230 through the rear surface (back of substrate 235) of light emitter 230 passes through substrate 235 and travels into wavelength converter 231. Laser light Ls traveling into wavelength converter 231 is wavelength-converted, diffused, and mixed in wavelength converter 231, and as a result, white light which is light Lt after the wavelength of laser light Ls is converted is output from light emitter 230.

Thus, even if light emitter 230 which is a light-transmissive phosphor device is used, the shape of second light guide 320d through which laser light Ls is emitted to light emitter 230 is fixed, and thus the position of the end portion through which laser light Ls is emitted can be maintained. Thus, according to light emitting apparatus 10g, light having a desired color or a desired amount of light can be obtained continuously.

Figure 13:
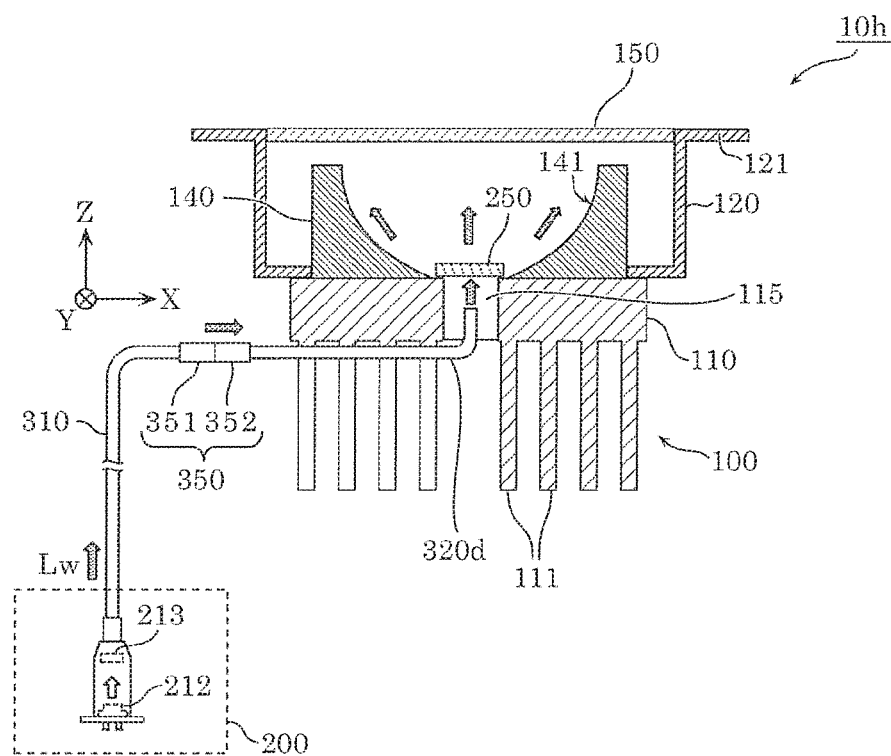
FIG. 13 is a diagram illustrating a schematic configuration of a light emitting apparatus according to Variation 8 of the embodiment.

FIG. 13 is a diagram illustrating a schematic configuration of light emitting apparatus 10h according to Variation 8 of the embodiment.

Light emitting apparatus 10h according to Variation 8 illustrated in FIG. 13 includes light source 200 and body 100, and body 100 outputs light based on laser light guided by first light guide 310 and second light guide 320d from light source 200. Second light guide 320d has a fixed shape, and is held by body 100. Specifically, second light guide 320d is held by body 100 in a state where the end portion is disposed in through-hole 115 formed in heat sink 110. This configuration is common to light emitting apparatus 10h according to Variation 8, and light emitting apparatus 10g according to Variation 7 described above.

Light emitting apparatus 10g according to this variation has a feature that white light is emitted by light source 200. Specifically, light source 200 includes semiconductor laser element 212 which emits, for example, blue laser light, and wavelength converter 213 which includes a yellow phosphor, for example.

Blue laser light emitted by semiconductor laser element 212 is converted to have a white color by wavelength converter 213 and passes through an optical system which is not illustrated, so as to be emitted from light source 200 as white light Lw. White light Lw emitted from light source 200 through first light guide 310 enters second light guide 320d held by body 100 from an end. White light Lw which has entered second light guide 320d from the end exits second light guide 320d from the other end, is diffused by optical member 250 which is, for instance, a lens, and further passes through cover member 150 and thus is output to the outside of body 100.

Thus, even if the wavelength of laser light is converted in light source 200, since the shape of second light guide 320d through white light Lw is emitted to optical member 250 is fixed, the position of the end portion through which white light Lw is emitted can be maintained. Thus, according to light emitting apparatus 10h, light having a desired color or a desired amount of light can be obtained continuously.

Other Embodiments

The above completes the description of the light emitting apparatus according to the present disclosure, based on the embodiment and the variations described above, yet the present disclosure is not limited to the embodiment and the variations described above.

For example, the light emitting apparatuses, namely, light emitting apparatuses 10 and 10a to 10h (hereinafter, referred to as "light emitting apparatuses 10 and so on") may not be used as lighting apparatuses which illuminate a predetermined space. For example, light emitting apparatuses 10 and so on may be used as light sources of an information display device which displays information. For example, light emitting apparatuses 10 and so on may be used as devices which report predetermined information by providing illumination or blinking.

For example, light source 200 and body 100 may not be connected on a one-to-one basis. For example, laser light may be supplied from single light source 200 to plural bodies 100. In this case, light source 200 may include plural semiconductor laser elements corresponding to plural bodies 100. As described above, plural semiconductor laser elements which supply laser light to plural bodies 100 are disposed at one place, and thus a cooling device can be disposed so as to cool the semiconductor laser elements in a centralized manner, for example, thus increasing cooling efficiency.

As illustrated in FIGS. 1 to 13, the shapes of light emitting apparatuses 10 and so on and the shapes of components such as second light guide 320 are examples, and not limited to the shapes illustrated in FIGS. 1 to 13. For example, a portion of second light guide 320 may be curved along reflection surface 141 of reflection member 140. Further, body 100 is cylindrical as a whole, yet body 100 may have a shape recognized as a rectangular parallelepiped as a whole, for example. For example, the cross section of a light guide such as second light guide 320 is not necessarily circular, but may be elliptical, oval, quadrilateral, or polygonal, or a shape which is a combination of a straight line and a curve, for example.

Light emitting apparatus 10 outputs white light which is a combination of blue laser light and a yellow phosphor in the embodiment and so on described above, yet the configuration for outputting white light is not limited to this. For example, white light may be obtained by combining a phosphor containing resin which contains a red phosphor and a green phosphor and blue laser light.

The scope of the present disclosure also includes embodiments as a result of adding, to the embodiments and the variations, various modifications that may be conceived by those skilled in the art, and embodiments achieved by combining elements in the embodiment and the variations in any manner without departing from the spirit of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light emitting apparatus, comprising:
a light source which emits laser light;
a first light guide which is flexible, and extends from the light source for guiding the laser light emitted by the light source;
a second light guide which is rigid, and is connected to the first light guide for guiding the laser light emitted by the light source; and
a body which holds the second light guide, and outputs, to an outside of the body, light based on the laser light guided by the first light guide and the second light guide.

2. The light emitting apparatus according to claim 1, wherein
the body includes a holding portion which holds a held portion of the second light guide, and
the second light guide includes:
the held portion; and
an extending portion which extends from the held portion, and includes an end surface through which the laser light is emitted.

3. The light emitting apparatus according to claim 2, wherein
the extending portion includes:
an arm portion which is elongated and extends in a longitudinal direction; and
a light emitting portion which extends from an end of the arm portion in a direction crossing the longitudinal direction of the arm portion, and includes the end surface through which the laser light is emitted.

4. The light emitting apparatus according to claim 2, wherein
the body includes a reflector which has a curved reflective surface, the end surface of the extending portion of the second light guide is within an area defined by the curved reflective surface, the area being defined by connecting ends of the curved reflective surface, and the holding portion is outside of the area defined by the curved reflective surface.

5. The light emitting apparatus according to claim 2, wherein the end surface of the extending portion of the second light guide is spaced apart from the held portion, and the extending portion includes at least one portion where a direction in which the laser light is guided is changed.

6. The light emitting apparatus according to claim 2, wherein the holding portion is disposed on an inner surface of the body, in an inside of the body.

7. The light emitting apparatus according to claim 2, wherein the holding portion includes an opening in the body.

8. The light emitting apparatus according to claim 1, wherein the body includes a light emitter which includes a wavelength conversion material which converts a wavelength of the laser light guided by the second light guide, and the body outputs, to the outside of the body, the light after the wavelength of the laser light is converted, the light being based on the laser light.

9. The light emitting apparatus according to claim 8, wherein the light emitter further includes a light reflector plate which reflects light, and the wavelength conversion material is located on the light reflector plate, on a side which receives the laser light.

10. The light emitting apparatus according to claim 9, wherein the body includes a heat sink disposed in contact with a surface of the light emitter on a side opposite the side which receives the laser light.

11. The light emitting apparatus according to claim 8, wherein a relative position of an end portion of the second light guide is fixed with respect to the light emitter without a member which blocks the laser light guided by the second light guide being disposed between the end portion of the second light guide and the light emitter.

12. The light emitting apparatus according to claim 1, further comprising:

a connecting member which detachably connects the first light guide and the second light guide.

13. The light emitting apparatus according to claim 1, wherein the second light guide includes bundled optical fibers.

14. The light emitting apparatus according to claim 13, wherein a numerical aperture of each optical fiber included in the first light guide is smaller than a numerical aperture of each of the bundled optical fibers included in the second light guide.

15. The light emitting apparatus according to claim 1, further comprising:

a second light source which emits second laser light; and a third light guide which is flexible, and extends from the second light source, wherein the second light guide is further connected to the third light guide, and the body outputs, to the outside of the body, the light based on the laser light guided by the first light guide and the second light guide and further based on the second laser light guided by the third light guide and the second light guide.

16. The light emitting apparatus according to claim 1, further comprising:

a second light source which emits second laser light;

a third light guide which is flexible, and extends from the second light source; and a fourth light guide which is rigid, and is connected to the third light guide, wherein the body outputs, to the outside of the body, the light based on the laser light guided by the first light guide and the second light guide and further based on the second laser light guided by the third light guide and the fourth light guide.

17. The light emitting apparatus according to claim 1, wherein the body includes a reflector which has a curved reflective surface, and the second light guide one of passes through the reflector or extends along a groove in an edge surface of the reflector.

18. The light emitting apparatus according to claim 1, wherein the body includes a light emitter which includes a wavelength conversion material which converts a wavelength of the laser light guided by the second light guide, the laser light is guided obliquely from the second light guide to the light emitter, and the body outputs, to the outside of the body, the light after the wavelength of the laser light is converted, the light being based on the laser light.

19. The light emitting apparatus according to claim 1, the second light guide is a prism.

20. An apparatus for emitting light based on laser light which is emitted from a light source, the apparatus comprising:

a connecting member which is configured to be connected to a first light guide which is flexible, the first light guide extending from the light source for guiding the laser light emitted by the light source;

a second light guide which is rigid, and is connected to the connecting member for being connected with the first light guide for guiding the laser light emitted by the light source; and a body which holds the second light guide, and outputs, to an outside of the body, light based on the laser light guided by the second light guide.

* * * * *